(12) United States Patent
Perkins

(10) Patent No.: US 10,457,271 B2
(45) Date of Patent: Oct. 29, 2019

(54) ENHANCED ENGINE AND BATTERY OPERATION

(71) Applicant: Ford Global Technologies, LLC, Dearborn, MI (US)

(72) Inventor: William Paul Perkins, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 413 days.

(21) Appl. No.: 15/377,260

(22) Filed: Dec. 13, 2016

(65) Prior Publication Data

US 2018/0162359 A1    Jun. 14, 2018

(51) Int. Cl.
| | |
|---|---|
| *B60W 20/00* | (2016.01) |
| *B60W 20/14* | (2016.01) |
| *B60W 20/12* | (2016.01) |
| *B60W 50/00* | (2006.01) |
| *B60W 10/06* | (2006.01) |
| *B60W 10/26* | (2006.01) |
| *B60W 10/30* | (2006.01) |
| *B60W 30/18* | (2012.01) |
| *B60W 30/188* | (2012.01) |
| *B60W 20/13* | (2016.01) |

(52) U.S. Cl.
CPC ............ *B60W 20/14* (2016.01); *B60W 10/06* (2013.01); *B60W 10/26* (2013.01); *B60W 10/30* (2013.01); *B60W 20/12* (2016.01); *B60W 20/13* (2016.01); *B60W 30/1882* (2013.01); *B60W 30/18127* (2013.01); *B60W 50/0097* (2013.01); *B60W 2050/0089* (2013.01); *B60W 2550/143* (2013.01); *B60W 2550/402* (2013.01); *B60W 2710/244* (2013.01); *B60W 2710/305* (2013.01)

(58) Field of Classification Search
USPC .......................................................... 701/22
See application file for complete search history.

(56) References Cited

U.S. PATENT DOCUMENTS

| | | | |
|---|---|---|---|
| 6,487,477 | B1 | 11/2002 | Woestman et al. |
| 7,490,000 | B2 | 2/2009 | Siddiqui et al. |
| 8,531,053 | B2 | 9/2013 | Choi et al. |
| 2010/0063658 | A1 | 3/2010 | Martin et al. |
| 2014/0288742 | A1 | 9/2014 | Hokoi et al. |
| 2015/0298680 | A1 | 10/2015 | Matthews |
| 2015/0336458 | A1 | 11/2015 | Lee et al. |

(Continued)

FOREIGN PATENT DOCUMENTS

| | | |
|---|---|---|
| CN | 104309605 A1 | 1/2015 |
| JP | 2015101145 A | 6/2015 |

OTHER PUBLICATIONS

UK Search Report dated May 31, 2018 re GB Appl. No. 1720155.9.

*Primary Examiner* — James M McPherson
(74) *Attorney, Agent, or Firm* — Frank A. MacKenzie; Bejin Bieneman PLC

(57) ABSTRACT

Information of a plurality of locations on a route for a vehicle is received. A plurality of segments of the route is identified based at least in part on the information. A specified state of charge of a vehicle battery and a specified power output of an engine are determined for each of the segments based at least in part on the information. One or more vehicle subsystems is actuated to navigate each of the segments to change a current state of charge of the vehicle battery to the specified state of charge.

20 Claims, 8 Drawing Sheets

(56) References Cited

U.S. PATENT DOCUMENTS

2016/0167641 A1     6/2016  Yoon
2017/0021823 A1*    1/2017  Ogawa ................... B60L 50/15
2017/0282895 A1    10/2017  Morisaki
2017/0313298 A1    11/2017  Arnaiz

* cited by examiner

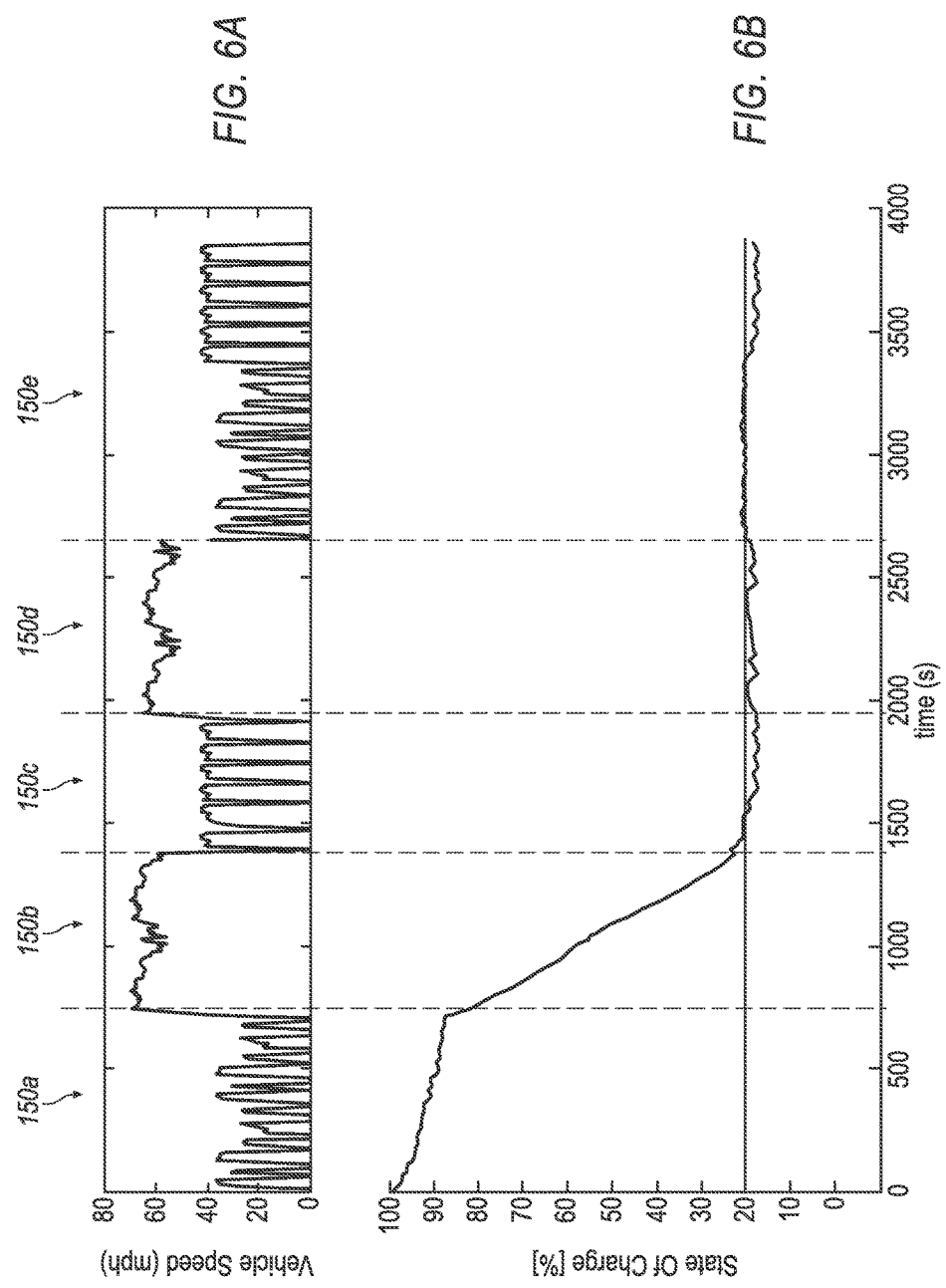

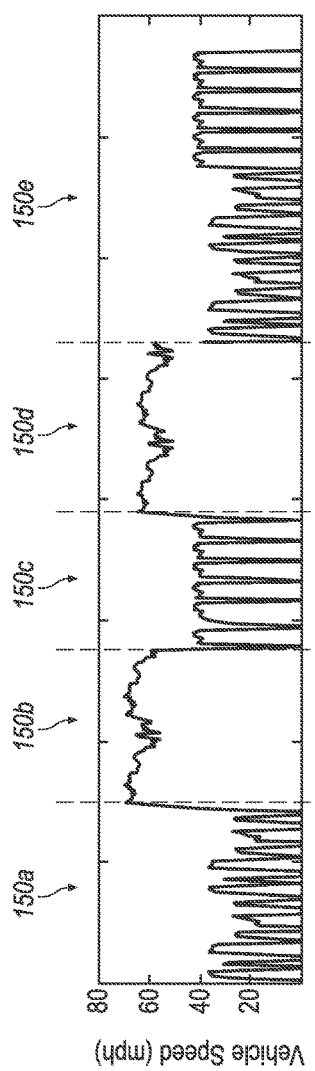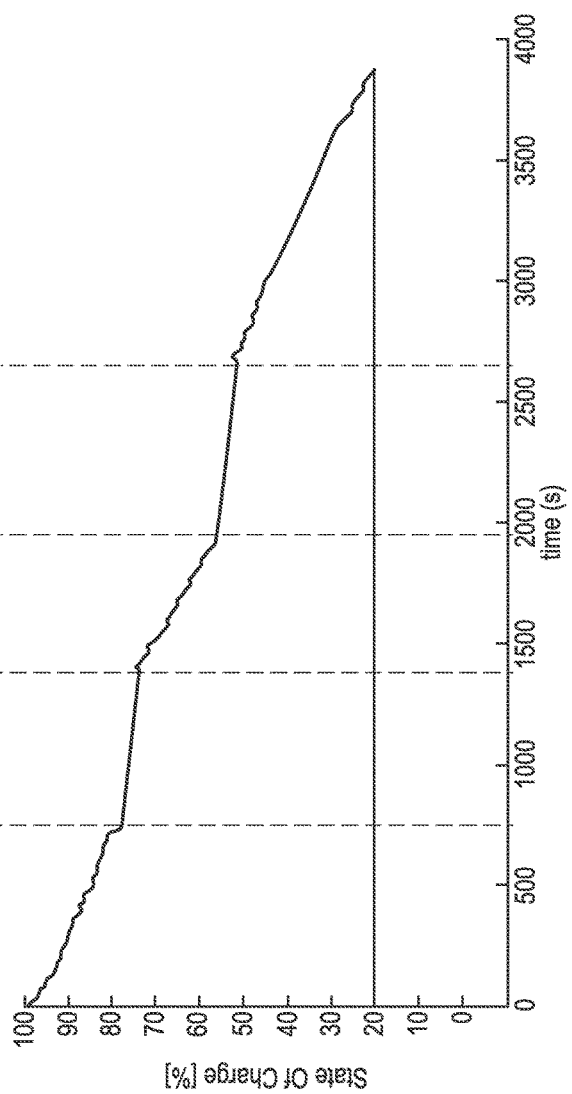
FIG. 7A
FIG. 7B

ENHANCED ENGINE AND BATTERY OPERATION

BACKGROUND

Vehicles can use a battery and an internal combustion engine to power vehicle components, including, e.g., a powertrain, a steering rack, etc. When the battery has depleted its charge, the internal combustion engine increases output to power the components, consuming fuel.

BRIEF DESCRIPTION OF THE DRAWINGS

FIGS. 6A-6B illustrate another state of charge of the vehicle battery along another example route.

FIGS. 7A-7B illustrate another state of charge of the vehicle battery reaching a depletion threshold at the end of the example route.

DETAILED DESCRIPTION

Figure 1:
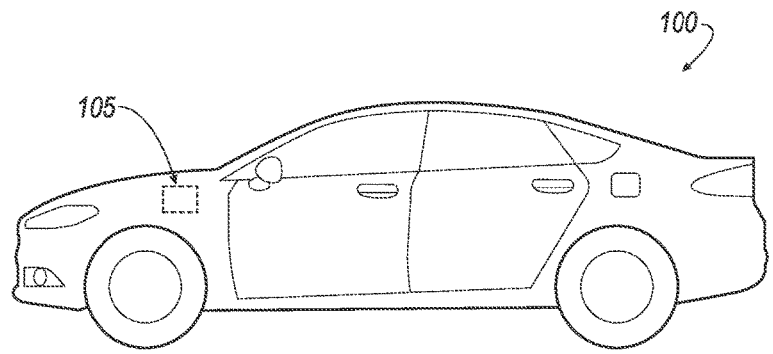
FIG. 1 illustrates a vehicle with an example energy management system.

An autonomous vehicle can use information collected about a predetermined route to determine when to actuate a battery system and an engine to reduce fuel consumption along the route. Because the autonomous vehicle knows the route before embarking on the route, the autonomous vehicle can use the information about the route to determine when to charge the battery and when to discharge the battery. Furthermore, the autonomous vehicle can use the engine to charge the battery system, allowing the autonomous vehicle to coordinate parts of the route where battery operation may be more efficient and parts where engine operation may be more efficient. Thus, the autonomous vehicle coordinates actuation of components with an energy management system to reduce fuel consumption.

Engine shaft energy can be converted to electrical energy and then to chemical energy in a battery. When the chemical energy is later converted back to shaft energy, the amount of shaft energy output may be less than the shaft energy input, creating a "conversion loss". When the battery has reached a low state of charge or can collect regenerative brake energy, the autonomous vehicle may increase the state of charge of the battery with the engine, generating conversion losses. However, when the autonomous vehicle is operating with the engine, increasing output of the engine to charge the battery may result in an increase in efficiency because the fuel saved by using the battery more often may offset the conversion losses. That is, running the engine at a higher output to charge the battery more quickly may result in a fuel savings that is higher than the conversion losses. The autonomous vehicle can predict that such a fuel saving may occur at one or more portions of the route, and may modify the commanded operation of the battery and the engine to increase the engine output at those portions.

Vehicle batteries can recharge with regenerative braking. When the state of charge of the battery is at a maximum, however, the charge power limit drops to zero and the battery cannot recover energy from the regenerative braking. An autonomous vehicle may know ahead of time where decelerations will occur (and thus energy can be recovered from regenerative braking), then the vehicle can ensure the battery is not at the maximum state of charge during these portions of the route. That is, the autonomous vehicle can increase battery output on earlier portions of the route or decreasing battery charging on earlier portions of route to recover all of the energy from the regenerative braking.

The route may have portions where the autonomous vehicle operates at a high speed (e.g., a highway) and portions where the autonomous vehicle operates at a low speed (e.g., a city). The autonomous vehicle can know the predicted speed for the portions of the route ahead of time, and can defer battery operation on the high-speed portions until the later lower-speed portions. The goal is to use the battery more in urban driving to avoid frequent engine on/off operation, which can be less efficient/burn more fuel. By deferring battery operation at one or more portions of the route, the autonomous vehicle can plan the battery to reach a low state of charge (e.g., become fully depleted) at the end of the route. The autonomous vehicle can know the route speed and grade profile in advance, and can plan engine output and battery output for the various portions of the route.

A vehicle controller can use an embedded vehicle model to implement these features that communicates with one or more modules that collect and store information about the route, e.g., grade, time, and distance of each segment of the route, traffic data, etc. The vehicle controller can use the information to predict a speed profile, a grade profile, a traffic profile, etc., for the route to command battery and engine operation on the route.

The system is implemented via a computer programmed to receive information of a plurality of locations on a route for a vehicle. The computer identifies a plurality of segments of the route based at least in part on the information. The computer determines a specified state of charge of a vehicle battery and a specified power output of an engine for each of the segments based at least in part on the information. The computer actuates one or more vehicle subsystems to navigate each of the segments to change a current state of charge of the vehicle battery to the specified state of charge.

The autonomous vehicle can use information about upcoming segments on the route to selectively operate the engine and the battery in the upcoming segments, reducing fuel consumption. That is, depending on the characteristics of the segment, adjusting the engine output and the battery discharge can result in an overall increase in battery operation on the route, reducing the amount of fuel consumed by the engine.

Because the computer knows the route ahead of time, and because the computer knows how the vehicle will be autonomously controlled at each segment along the route, the computer can increase the engine output in one or more segments to charge the battery more quickly upon depletion. As a result, the computer can use the battery more frequently in upcoming segments. Because the battery is used more frequently, the overall engine output of the route is reduced, reducing the fuel consumption of the vehicle.

In another example, the computer can use information about the predetermined route to predict increases in the battery state of charge from regenerative braking in upcoming segments. The computer can command increased battery output in earlier segments to capture all of the energy from the regenerative braking in later segments 150. By increasing the battery output and capturing all available regenerative braking energy, the overall engine output of the route is reduced, reducing the fuel consumption of the vehicle.

In yet another example, the computer can identify segments of the predetermined route where the vehicle is predicted to move above a predetermined speed threshold, e.g., segments on a highway. In these segments, the computer can increase engine output to delay depletion of the battery. Thus, the battery can be used in segments where the predicted speed is below the speed threshold, e.g., segments in a city, where operation of the battery can be more efficient. Furthermore, by identifying segments to increase engine output, the computer can selectively reduce the state of charge of the battery to a depletion threshold upon completion of the route. Thus, by increasing use of the battery along the route and delaying depletion of the state of charge until segments where battery operation may be more efficient, the fuel consumption of the vehicle is reduced.

FIG. 1 illustrates a host vehicle 100 including an energy management system 105. The system 105 determines the route of the vehicle 100 and adjusts the engine 120 and the battery system 125 based on the route and autonomous control of the host vehicle 100 along the route. Although shown as a car, the host vehicle 100 may include any passenger or commercial automobile such as a car, a truck, a sport utility vehicle, a crossover vehicle, a van, a minivan, a taxi, a bus, etc. In some possible approaches, as discussed below, the host vehicle 100 is an autonomous vehicle that can operate in various autonomous (e.g., driverless) modes.

Figure 2:
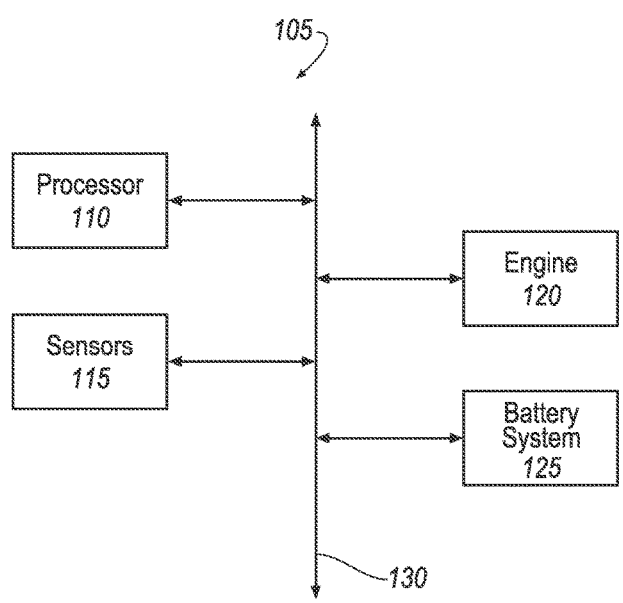
FIG. 2 is a block diagram of the example energy management system.

FIG. 2 is a block diagram showing example components of the host vehicle 100 including components of the energy management system 105. The energy management system 105 includes or works in accordance with a processor 110, at least one sensor 115, an engine 120, a battery system 125, and a communications bus 130. The energy management system 105 can be implemented by an existing vehicle computer, e.g., an autonomous mode controller, a power train control module, a navigation system, etc. Sensors 115, which are implemented via circuits, chips, or other electronic components, include a variety of devices, e.g., a state of charge sensor, a throttle sensor, etc. The sensors 115 can output data to the processor 110 via the vehicle 100 network or bus 130, e.g., data relating to vehicle speed, acceleration, position, system and/or component status, etc. Alternatively, the sensors 115 can output data to a controller. Other sensors 115 could include cameras, motion detectors, etc., i.e., sensors to provide data for evaluating a location of the vehicle, projecting a path of the vehicle in one or more segments, etc.

The vehicle 100 includes the engine 120. The engine 120 can be an internal combustion engine, e.g., a spark-ignition engine, a diesel engine, a homogeneous-charge compression-ignition engine, etc. The engine 120 can provide energy to a powertrain which transfers the energy to rotational motion of wheels of the vehicle 100, propelling the vehicle 100. The processor 110 can selectively increase or decrease output of the engine 120 depending on the characteristics of the roadway and the state of charge of the battery system 125.

The vehicle 100 includes the battery system 125. The battery system 125 includes two or more batteries that store energy to power the powertrain to propel the vehicle 100. The battery system 125 can further power one or more vehicle 100 subsystems, e.g., a climate control subsystem, an entertainment subsystem, a brake subsystem, a steering subsystem, etc. The batteries of the battery system 125 can include, e.g., a lead-acid battery, a nickel-metal-hydride battery, a lithium-ion battery, etc.

The bus 130 communicatively connects the processor 110, the sensors 115, the engine 120, and the battery system 125. The bus 130 sends and receives data throughout the system 105, e.g., sending instructions from the processor 110 to the engine 120 to increase output. The bus 130 may be a controller area network (CAN) bus.

The processor 110 is implemented via circuits, chips, or other electronic component that can receive the data from the sensors 115. The processor 110 may be programmed to process the sensor 115 data. Processing the data may include processing geo-coordinates or other data stream captured by the sensors 115 to determine one or more segments of the route and predict operation of the vehicle 100 in the segments. As described below and shown in FIG. 2, the processor 110 instructs vehicle components, e.g., a powertrain subsystem, to actuate.

When the processor 110 operates the vehicle 100, the vehicle 100 is an "autonomous" vehicle 100. For purposes of this disclosure, the term "autonomous vehicle" is used to refer to a vehicle 100 operating in a fully autonomous mode. A fully autonomous mode is defined as one in which each of vehicle 100 propulsion (typically via a powertrain including an electric motor and/or internal combustion engine), braking, and steering are controlled by the processor 110.

The processor 110 may control components of the vehicle 100, e.g., to stop the vehicle 100, to avoid targets, etc. The processor 110 may be programmed to operate some or all of the components with limited or no input from a human operator. When the processor 110 operates the components, the processor 110 can ignore input from the human operator with respect to components selected for control by the processor 110, which provides instructions, e.g., via a vehicle 100 communications bus 130 and/or to electronic control units (ECUs) as are known, to actuate the components, e.g., to apply brakes, change a steering wheel angle, etc. For example, if the human operator attempts to turn a steering wheel during steering operation, the processor 110 may ignore the movement of the steering wheel and steer the vehicle 100 according to its programming.

Figure 3:
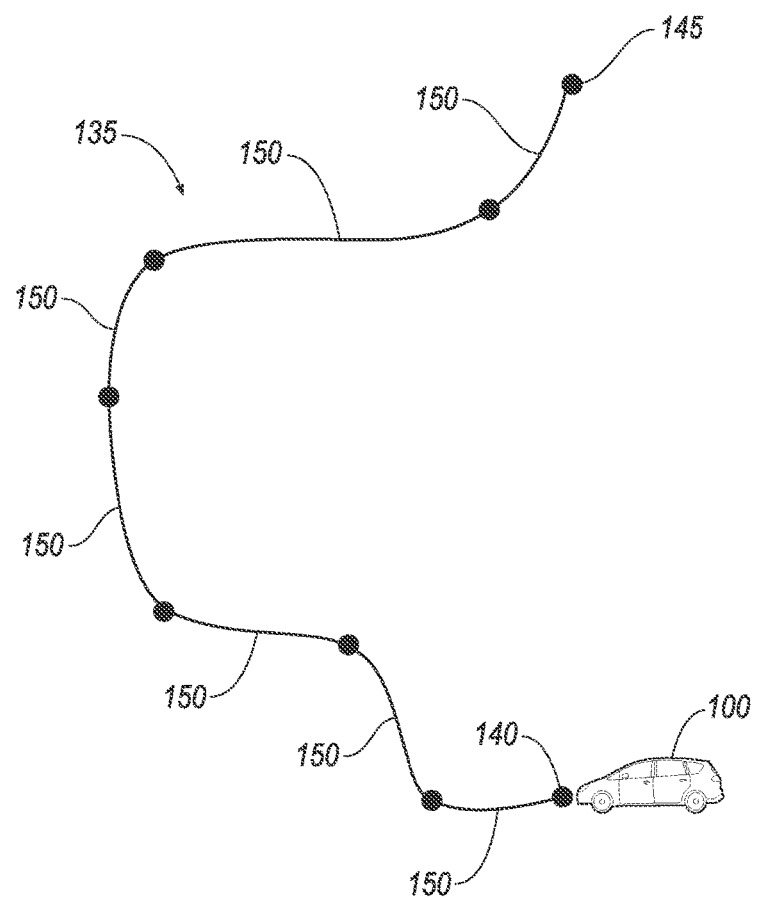
FIG. 3 shows an example route that the vehicle travels from a start point to a destination.

FIG. 3 illustrates the autonomous vehicle 100 traveling along a route 135. The route 135 may be a set of directions and locations that the vehicles 100 follows to get from a start point 140 to a destination 145. The route 135 may be divided into segments 150. Each segment 150 is a portion of the route 135 where the processor 110 determines operation of the engine 120 and the battery system 125 to propel the vehicle 100. Because the vehicle 100 is autonomous, the processor 110 can plan operation of the engine 120 and the battery system 125 for each segment 150 of the route. For example, the processor 110 can increase operation of the battery system 125 in a first segment 150, while in a second segment 150, the processor 110 can decrease operation of the battery system 125 and increase operation of the engine 120. Dividing the route 135 into segments 150 allows the processor 110 to determine battery system 125 and engine 120 operation to increase fuel efficiency of the vehicle 100. The processor 110 can specify a power output of the engine 120 and a state of charge of the battery system 125 for each segment 150.

The processor 110 can use the route 135 to change the state of charge of the battery system 125 and increase fuel efficiency prior to embarking on the route 135. The processor 110 can receive information of a plurality of locations on the route 135 for a vehicle 100. For example, the route 135 can include locations that have increased road grade (i.e., are steeper and may require additional propulsion output), more traffic intersections, are city or highway roads, etc. Based on the information, the processor 110 can identify the segments 150 of the route 135. For example, the segments 150 can be portions of a roadway of a predetermined distance, e.g., 1 mile. Alternatively or additionally, the route 135 may have predetermined segments 150 determined by, e.g., a navigation system. The processor 110 can determine a specified state of charge of the battery system 125 and a specified power output of the engine 120 for each of the segments 150 prior to embarking on the route 135 based at least in part on the information. For example, if one of the segments 150 is on a highway, the processor 110 can plan a decrease of battery system 125 output and an increase of engine 120 output to recharge the battery system 125 for use in non-highway segments 150. Based on the determined battery system 125 and engine 120 outputs, the processor 110 can actuate one or more vehicle subsystems to navigate each of the segments 150. The processor 110 can operate the vehicle subsystems to change a current state of charge of the battery system 125 to the specified state of charge. For example, the processor 110 can selectively actuate a powertrain subsystem with one of the battery system 125 and the engine 120 to change the current state of charge of the battery system 125.

The processor 110 can collect new information while the vehicle 100 is traveling along the route 135. The new information can change the determination of the processor 110 for operation of the engine 120 and the battery system 125 in one or more segments 150. The processor 110 can be programmed to adjust the specified state of charge of the battery system 125 and the specified power output of the engine 120 for upcoming segments 150 based on the new information. For example, the processor 110 can receive new traffic information that reduces a predicted speed for an upcoming segment 150. Based on the new traffic information, the processor 110 can specify a lower state of charge of the battery system 125 and a reduced power output of the engine 120, operating the powertrain subsystem with the battery system 125 in the upcoming segment to conserve fuel.

Figure 4A:
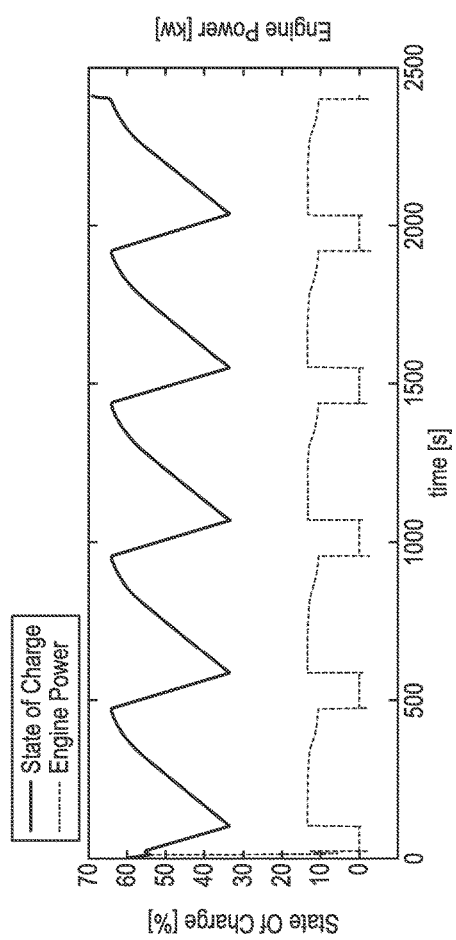
FIGS. 4A-4B illustrate a state of charge of a vehicle battery and a power output of a vehicle engine along the example route.
Figure 4B:
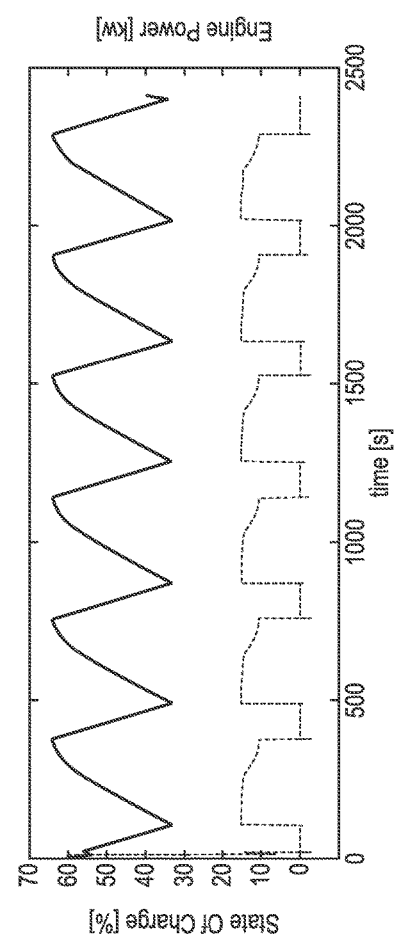

FIGS. 4A and 4B are graphs illustrating adjusting operation of the battery system 125 and the engine 120 in the segments to increase fuel efficiency of the vehicle 100. FIGS. 4A and 4B illustrate operation of the vehicle 100 traveling in a segment 150 at a constant speed. FIG. 4A illustrates a first example graph of the state of charge of the battery system 125 and the power output of the engine 120. Specifically, the state of charge of the battery system 125 is represented by the solid line and is measured on the left vertical axis, measured in percent. The power output of the engine 120 is represented by the dashed line and is measured on the right vertical axis, measured in kilowatts. The horizontal axis measures time in seconds. Thus, the segments 150 can corresponds to specific times on the horizontal axis, as shown in FIGS. 4A-4B.

FIG. 4A shows an example graph of battery system 125 and engine 120 operation, and FIG. 4B shows another example graph with higher engine 120 output and more frequent use of the battery system 125. The engine 120 and battery system 125 operation of FIG. 4B can result in an increase in fuel efficiency when the conversion losses are smaller than the energy saved from the reduced fuel consumption. The processor 110 can be programmed to identify one or more segments 150 where the speed of the vehicle 100 is predicted to be above a speed threshold and to increase the power output of the engine 120 when the vehicle 100 is in those segments 150. The processor 110 can be programmed to plan an increase of the specified power output of the engine 120 for at least one of the segments 150 to allow for an increase of the state of charge of the battery system 125 for an upcoming segment 150.

Operation of the engine 120 can increase the state of charge of the battery system 125, and when the state of charge of the battery system 125 reaches a threshold, the processor 110 reduces operation of the engine 120 and increases operation of the battery system 125, reducing fuel consumption. When the state of charge of the battery system 125 drops to a second threshold, the processor 110 increases operation of the engine 120 and reduces operation of the battery system 125 until the state of charge of the battery system 125 increases to the threshold again. FIGS. 4A-4B show the threshold to be about 60% and the second threshold to be about 30%, but the threshold and the second threshold can be other values.

Figure 5:
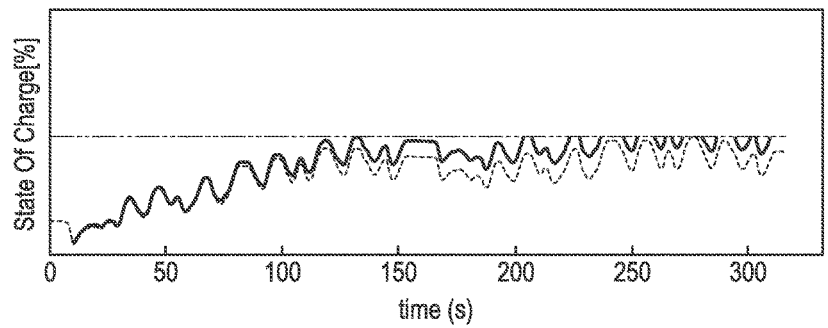
FIG. 5 illustrates another state of charge of the vehicle battery along the example route.

Fuel efficiency can be increased by increasing power output of the engine 120 to increase the state of charge of the battery system 125 and to use the battery system 125 more frequently along the route 135. The conversion of engine 120 output energy to chemical energy in the battery system 125 and later back into energy for the powertrain is known as "conversion loss." Increasing power output of the engine 120 can charge the battery system 125 more quickly. The charging allows the battery system 125 to be used more frequently and results in a fuel savings that can be greater than the conversion losses. Thus, when the energy saved by operating the engine 120 less frequently is greater than the conversion losses caused by charging the battery system 125, the processor 110 can command operation of the battery system 125 and the engine 120 to segments 150 of the route 135 to increase output of the engine 120. FIG. 5 illustrates an example graph of a state of charge of the battery system 125 along the route. The state of charge of the battery system 125 can increase with regenerative braking. That is, some of the energy expended when braking the vehicle 100 can be recovered as electrical energy, increasing the state of charge of the battery system 125. Thus, when one or more segments 150 have decelerations of the vehicle 100 that require braking, the processor 110 can be programmed to use the decelerations to increase the state of charge of the battery system 125.

However, when the state of charge of the battery system 125 is at a maximum state of charge, the recovered electrical energy cannot be stored. Thus, the processor 110 can be programmed to increase battery system 125 output in one or more segments 150 prior to a predicted deceleration to ensure that recovered electrical energy from regenerative braking increases the state of charge of the battery system 125.

The graph of FIG. 5 shows two example states of charge of the battery over time. The vertical axis measures the state of charge of the battery system 125 in percent. The horizontal axis measures time in seconds. The solid line shows a first example state of charge where the battery system 125 reaches a maximum state of charge. The maximum state of charge is represented by the dotted line. Around times of 200 second, 250 seconds, and 300 seconds, the state of charge reaches the maximum state of charge, so an additional energy cannot be stored.

The dashed line shows a second example state of charge where the processor 110 increases battery system 125 output and maintains the state of charge below the maximum for the entire period of time shown in the graph. For example, at about 150 seconds, the processor 110 can increase battery system 125 output to lower the state of charge away from the maximum. Thus, when the vehicle 100 decelerates later (e.g., near 200 seconds) and energy can be recovered from regenerative braking, the recovered energy is stored in the battery system 125. That is, all recoverable energy is stored and shown as an increase in the state of charge that does not reach the maximum state of charge.

The first state of charge graph, by reaching the maximum state of charge, loses the opportunity to recover braking energy as electrical energy. As a result, the second state of charge graph, which decreased the state of charge of the battery system 125 earlier in time, does not reach the maximum state of charge and can fully recover the energy from regenerative braking. The processor 110 can estimate the energy recoverable by regenerative braking based on, e.g., a speed of the vehicle 100, a mass of the vehicle 100, a road grade, an estimated drag force, etc.

The processor 110 can be programmed to command a specified power output of the engine 120 and output of the battery system 125 to the segments 150 of the route 135 prior to embarking on the route 135 to reduce the state of charge of the battery system 125 to a depletion threshold at the end of the route 135. The processor 110 can use information collected prior to embarking on the route 135 to plan discharging and recharging of the battery system 125 in the segments 150 to maintain the state of charge until the end of the route 135. Vehicles 100 may deplete the state of charge of the battery system 125 early in the route 135, requiring output from the engine 120 when the road conditions may not be ideal for engine 120 use. By maintaining the state of charge of the battery system 125 throughout the route 135 and reducing the state of charge toward the end of the route, the processor 110 can ensure that segments 150 where use of the battery system 125 is preferred will have sufficient charge to operate in those segments 150. Thus, overall fuel consumption on the route 135 is reduced.

For example, the route 135 can include segments 150 where the vehicle 100 is moving on a highway and segments 150 where the vehicle 100 is moving in a city. The processor 110 can determine whether a specific segment 150 is in the city or on the highway based on, e.g., location data. In the city, where frequent accelerations and decelerations are common, operating the powertrain with the battery system 125 can be more efficient than with the engine 120. On the highway, where the vehicle 100 operates at a substantially constant speed that is higher than in the city, operating the powertrain with the engine 120 can be more efficient because the battery system 125 would lose its state of charge more quickly. Thus, the processor 110 can be programmed to adjust the power output of the engine 120 and the charge output of the battery system 125 based on the specific segment 150. Specifically, the processor 110 can use a predetermined speed threshold, e.g., a posted speed limit on the highway, and actuate one or more subsystems with the battery system 125 when the vehicle 100 is not in the one or more segments 150 where the vehicle 100 speed is predicted to be above the speed threshold.

FIG. 6A illustrates a predicted speed profile for five segments 150a, 150b, 150c, 150d, 150e that comprise an example route 135. The vertical axis measures speed in miles per hour (mph). The horizontal axis measures time in seconds. The graph shows the predicted speed that the vehicle 100 would follow in the segments 150a-150e. The vertical dashed lines demarcate the segments 150a-150e in both FIGS. 8A-8B. Based on the predicted speeds in the segments 150a-150e, the processor 110 can determine whether each segment 150a-150e is on a highway or in a city. For example, the segments 150a, 150c, 150e have many accelerations and decelerations, frequently moving to and from a speed of 0, indicating that the segments 150a, 150c, 150e can be in a city. Furthermore, the segments 150b, 150d have a higher speed that stays more constant, indicating that the segments 150b, 150d can be on a highway.

FIG. 6B illustrates an example state of charge of the battery system 125 of the vehicle 100 while moving in the segments 150a-150e. The vertical axis shows the state of charge of the battery system 125 in percent. The horizontal axis measures time in seconds. The example of FIGS. 6A-6B illustrate operating the vehicle 100 solely with the battery system 125 from the start of the route 135. As the vehicle 100 moves in the segment 150b with a higher speed than the segment 150a, the state of charge of the battery system 125 drops rapidly. The state of charge of the battery system 125 drops to a depletion threshold at about 1500 seconds, less than halfway through the route 135. Specifically, the segment 150b can be on a highway, where engine 120 operation can be more efficient. Because the vehicle 100 is traveling at a substantially constant and high speed, the state of charge of the battery system 125 decreases quickly, reaching the depletion threshold before the route 135 is complete. Thus, more fuel is consumed in the segments 150c and 150e, which can be in a city where battery system 125 operation can be more efficient. In FIG. 6B, the depletion threshold is 20%, but the depletion threshold can be a different value.

FIGS. 7A-7B illustrates an example graph of the state of charge of the battery system 125 reaching the depletion threshold at the end of the route 135. FIG. 7A is a reproduction of FIG. 6A, included for comparison with FIG. 7B. As with FIG. 6A, FIG. 7A shows the predicted speed of the vehicle 100 in the segments 150a-150e.

FIG. 7B illustrates the state of charge of the battery system 125. As in FIG. 6B, the graph of FIG. 7B shows the state of charge of the battery system 125 in each of the segments 150a-150e over time. FIG. 7B shows the state of charge reaching the depletion threshold (20% in the example of FIG. 7B, but could be a different value) at the end of the segment 150e, i.e., the end of the route 135.

The processor 110 can be programmed to selectively actuate the engine 120 in one or more of the segments 150a-150e to maintain the state of charge of the battery system 125 until the end of the route 135. That is, based on a predicted speed for each segment 150a-150e, the processor 110 can selectively actuate the engine 120 rather than the battery system 125 for one or more segments 150a-150e, preserving the state of charge. As a result, the processor 110 can selectively actuate the battery system 125 to reduce the state of charge to reach the depletion threshold concurrently with completion of the route 135. For example, the processor 110 can increase engine output during the segments 150b, 150d, which have a higher speed and can be on the highway, and increase battery system 125 output during the segments 150a, 150c, 150e, which can be in the city, as shown in FIG. 9B. Thus, the state of charge of the battery system 125 can be maintained until the end of the route 135, decreasing fuel consumption of the vehicle 100.

Figure 8:
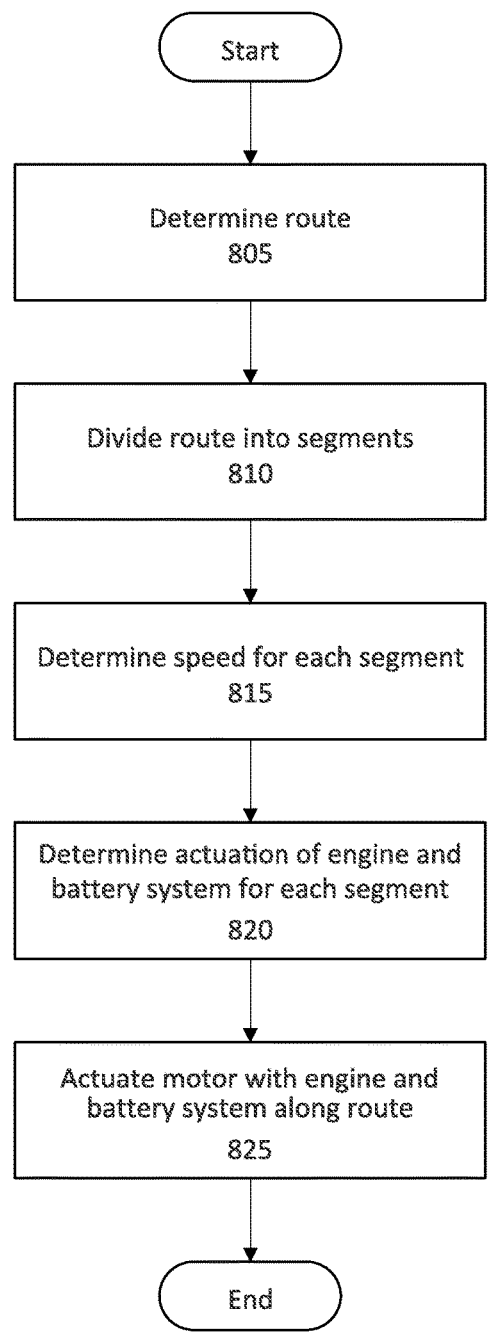
FIG. 8 is a block diagram of an example process for actuating the vehicle battery and the vehicle engine along the example route.

FIG. 8 illustrates a process 800 for actuating a vehicle propulsion based on assigned battery system 125 and engine 120 output. The process 800 begins in a block 805, where the processor 110 determines the route 135 for the vehicle 100. As described above, the processor 110 can use path-determining techniques to determine the route 135 from the start point 140 to the destination 145.

In a block 810, the processor 110 divides the route into a plurality of segments 150. Each segment 150 is a portion of the route 135 that the processor 110 can command a specified state of charge of the battery system 125 and output of the engine 120 based on information collected about the segment 150. For example, if the segment 150 is on a highway, the processor 110 can command a higher engine 120 output to attain and maintain a higher speed. The processor 110 can determine the segments 150 by identifying portions of the roadway along the route 135 that share common characteristics, e.g., the roadway is a highway, the roadway is in a city, the roadway has several traffic lights, etc.

In a block 815, the processor 110 determines a specified speed for each segment 150. The specified speed can be based on, e.g., a posted speed limit, a predicted traffic flow in the segment, weather conditions, etc. The processor 110 can use information gathered from a data source, e.g., a remote server, other vehicles 100, etc., to determine the specified speed. The processor 110 can use the commanded speeds to determine battery system 125 and engine 120 output for each segment 150.

In a block 820, the processor 110 determines a power output for the engine 120 and a charge output for the battery system 125 for each segment 150. Based on the speed and the predicted state of charge of the battery system 125, the processor 110 can command a power output of the engine 120 to maintain the speed and increase the state of charge of the battery system 125. The processor 110 can alternatively command an output of the battery system 125 to decrease the state of charge of the battery system 125. The processor 110 can command the engine 120 output and the battery system 125 output to increase the amount of time that the powertrain operates on the battery system 125, as shown in FIG. 4B, increasing fuel efficiency of the vehicle 100. As described above, the processor 110 can command a higher power output of the engine 120 to increase the state of charge of the battery system 125 more quickly, allowing the processor to use the battery system 125 to power the powertrain more frequently. For example, if the segment 150 is on a highway or other roadway with a high speed and few stops, the processor 110 can command a higher output for the engine 120 and lower output for the battery system 125. In another example, if the segment 150 is on a roadway with lower speeds and more frequent stops, the processor 110 can command a lower output for the engine 120 and a higher output for the battery system 125.

In a block 825, the processor 110 actuates the battery system 125 and the engine 120 according to the specified state of charge and power output along the route 135. The processor 110 sends control signals to the battery system 125 over the bus 130 and actuates switches that transfer energy from the battery system 125 to one or more vehicle components, e.g., a brake, a steering rack, etc. Alternatively or additionally, the processor 110 can send control signals to a controller that actuates the switches. Furthermore, the processor 110 can send control signals to a throttle and/or a fuel injector to increase or decrease an amount of fuel and air combusted by the engine 120. As described above, actuating the engine 120 and the battery system 125 according to the specified state of charge and power output can result in a reduction of fuel consumed by the vehicle 100. Following the block 825, the process 800 ends.

Figure 9:
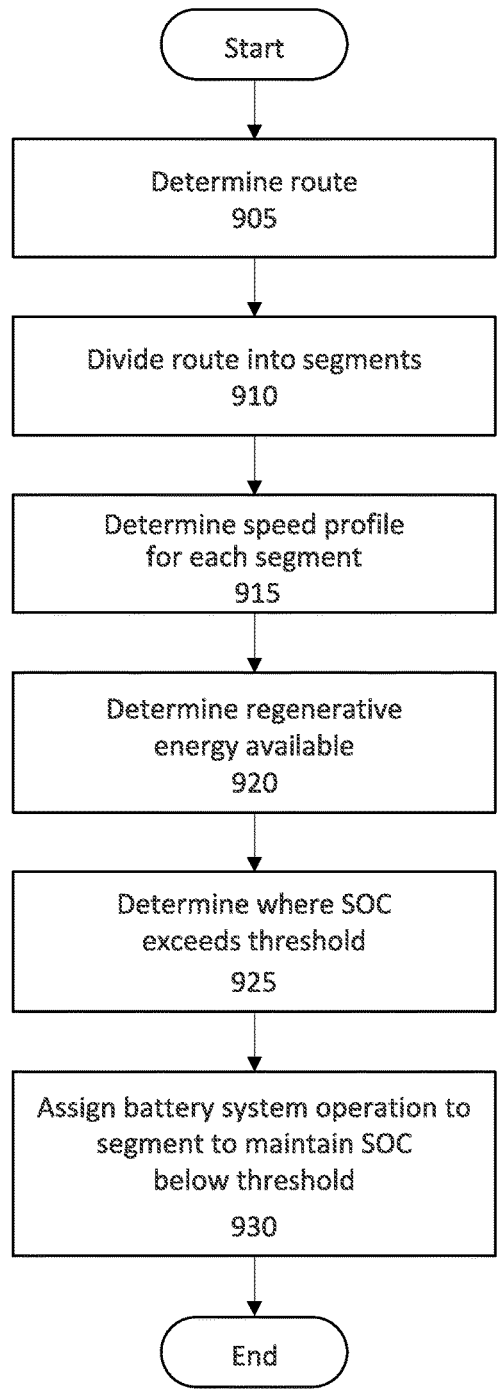
FIG. 9 is a block diagram of an example process for adjusting the state of charge of the vehicle battery to recover regenerative braking energy along the example route.

FIG. 9 illustrates an example process 900 for adjusting the state of charge of the battery system 125 to recover energy from regenerative braking. The process 900 begins in a block 905, where the processor 110 determines the route 135 to be traveled by the vehicle 100. As described above, the processor 110 can use path-determining techniques to determine the route 135 from the start point 140 to the destination 145. Alternatively or additionally, the processor 110 can determine the route 135 with a navigation system.

In a block 910, the processor 110 divides the route 135 into a plurality of segments 150. Each segment 150 is a portion of the route 135 that the processor 110 can command a specified state of charge of the battery system 125 and output of the engine 120 based on the characteristics of the segment 150. For example, if the segment 150 is on a highway, the processor 110 can command a higher engine 120 output to attain a higher speed. The processor 110 can determine the segments 150 by identifying portions of the roadway along the route 135 that share common characteristics, e.g., the roadway is a highway, the roadway is in a city, the roadway has several traffic lights, etc.

In a block 915, the processor 110 determines a speed profile for each segment 150. The speed profile includes the projected speed that the vehicle 100 will maintain in the segment 150 as well as accelerations and decelerations based on the segment 150. For example, the segment 150 may be on a highway with a substantially constant speed and little to no decelerations. In another example, the segment 150 may be on a busy city street with a plurality of traffic lights, requiring more than one deceleration to a stop and acceleration from the stop.

In a block 920, the processor 110 predicts the amount of regenerative energy available from the predicted decelerations along the route 135. The processor 110 can be programmed to estimate the amount of regenerated energy and the time at which the energy is regenerated based on the information about the segments 150.

In a block 925, the processor 110 determines where the regenerated energy would increase the state of charge of the battery system 125 above a charge threshold. The charge threshold can be determined as a state of charge less than the maximum state of charge by a predicted increase in the state of charge. As described above, when the regenerated energy would increase the state of charge of the battery system 125 beyond a maximum state of charge, the regenerated energy may be lost. The processor 110 can be programmed to identify where on the route 135 the regenerated energy would increase the state of charge of the battery system 125 to potentially lose recoverable energy. The processor 110 can identify one or more segments 150 where the specified state of charge of the battery system 125 will increase because of the regenerated energy.

In a block 930, the processor 110 commands increased battery system 125 operation to one or more segments 150 to reduce the state of charge of the battery system 125 to below the charge threshold. The processor 110 can actuate one or more of the subsystems to keep the current state of charge of the battery system 125 below the charge threshold prior to entering the one or more segments 150 to ensure that the predicted recovered energy will be fully recovered by the battery system 125. Furthermore, the processor 110 can be programmed to reduce the power output of the engine 120 prior to entering the one or more segments 150 to reduce the current state of charge of the battery system 125 to below the charge threshold. The processor 110 can selectively command the battery system 125 output and the engine 120 output to reduce the state of charge of the battery system 125 below the charge threshold by the regenerated state of charge predicted by the processor 110. Following the block 930, the process 900 ends.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims. It is intended that future developments will occur in the technologies discussed herein, and that the disclosed systems and methods will be incorporated into such future embodiments. In sum, it should be understood that the application is capable of modification and variation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising a computer including a processor and a memory, the memory storing instructions executable by the processor to:
   receive information of a plurality of locations on a route for a vehicle;
   identify a plurality of segments of the route based at least in part on the information;

specify a speed to be attained by the vehicle for each of the plurality of segments;

specify a state of charge of a vehicle battery and a power output of an engine, which the vehicle is to attain, for each of the plurality of segments based at least in part on the specified speed; and actuate one or more vehicle subsystems to navigate each of the plurality of segments to change a current state of charge of the vehicle battery to the specified state of charge for each of the plurality of segments.

2. The system of claim 1, wherein the instructions further include instructions to actuate a powertrain subsystem with one of the vehicle battery and the engine based at least in part on the information to change the current state of charge of the vehicle battery to the specified state of charge.

3. The system of claim 1, wherein the instructions further include instructions to increase the specified power output of the engine for at least one of the plurality of segments based at least in part on the information to increase the current state of charge of the vehicle battery.

4. The system of claim 1, wherein the instructions further include instructions to identify one or more segments where the specified state of charge of the vehicle battery will increase and to actuate one or more of the one or more vehicle subsystems to keep the current state of charge of the vehicle battery below a charge threshold prior to entering the one or more segments.

5. The system of claim 4, wherein the instructions further include instructions to identify a segment where a brake subsystem is predicted to increase the current state of charge of the battery with regenerative braking and to actuate one or more of the one or more vehicle subsystems to reduce the current state of charge of the vehicle battery below the charge threshold prior to entering the segment.

6. The system of claim 5, wherein the instructions further include instructions to predict a regenerated state of charge produced by the brake subsystem in the segment and to reduce a power output of the engine prior to entering the segment to reduce the current state of charge of the battery below the charge threshold by the regenerated state of charge predicted by the processor.

7. The system of claim 1, wherein the instructions further include instructions to identify one or more segments where a vehicle speed is predicted to be above a speed threshold and to increase a power output of the engine when the vehicle is in the one or more segments.

8. The system of claim 7, wherein the instructions further include instructions to actuate the one or more vehicle subsystems with the vehicle battery when the vehicle is not in the one or more segments in which the vehicle speed is predicted to be above the speed threshold.

9. The system of claim 1, wherein the instructions further include instructions to actuate the one or more vehicle subsystems to reduce the state of charge of the battery to reach a depletion threshold concurrently with completion of the route.

10. The system of claim 1, wherein the instructions further include instructions to receive new information about the plurality of segments while the vehicle is moving along the route and to adjust the specified state of charge of the vehicle battery and the specified power output of the engine for one or more upcoming segments based on the new information.

11. A method, comprising:
receiving information of a plurality of locations on a route for a vehicle;
identifying a plurality of segments of the route based at least in part on the information;
specifying a speed to be attained by the vehicle for each of the plurality of segments;
specifying a state of charge of a vehicle battery and a specified power output of an engine, which the vehicle is to attain, for each of the plurality of segments based at least in part on the specified speed; and
actuating one or more vehicle subsystems to navigate each of the plurality of segments to change a current state of charge of the vehicle battery to the specified state of charge for each of the plurality of segments.

12. The method of claim 11, further comprising actuating a powertrain subsystem with one of the vehicle battery and the engine based at least in part on the information to change the current state of charge of the vehicle battery to the specified state of charge.

13. The method of claim 11, further comprising increasing the specified power output of the engine for at least one of the plurality of segments based at least in part on the information to increase the current state of charge of the vehicle battery.

14. The method of claim 11, further comprising identifying one or more segments where the specified state of charge of the vehicle battery will increase and actuating one or more of the one or more vehicle subsystems to keep the current state of charge of the vehicle battery below a charge threshold prior to entering the one or more segments.

15. The method of claim 14, further comprising identifying a segment where a brake subsystem is predicted to increase the current state of charge of the battery with regenerative braking and actuating one or more of the one or more vehicle subsystems to reduce the current state of charge of the vehicle battery below the charge threshold prior to entering the segment.

16. The method of claim 15, further comprising predicting a regenerated state of charge produced by the brake subsystem in the segment and reducing a power output of the engine prior to entering the segment to reduce the current state of charge of the battery below the charge threshold by the regenerated state of charge predicted by a processor.

17. The method of claim 11, further comprising identifying one or more segments where a vehicle speed is predicted to be above a speed threshold and to increase a power output of the engine when the vehicle is in the one or more segments.

18. The method of claim 17, further comprising actuating the one or more vehicle subsystems with the vehicle battery when the vehicle is not in the one or more segments in which the vehicle speed is predicted to be above the speed threshold.

19. The method of claim 11, further comprising actuating the one or more vehicle subsystems to reduce the state of charge of the battery to reach a depletion threshold concurrently with completion of the route.

20. The method of claim 11, further comprising receiving new information about the plurality of segments while the vehicle is moving along the route and to adjust the specified state of charge of the vehicle battery and the specified power output of the engine for the upcoming segments based on the new information.

* * * * *